May 17, 1966 F. L. BUSH ETAL 3,251,543
SHOPPING CART ATTACHMENT
Filed May 3, 1965
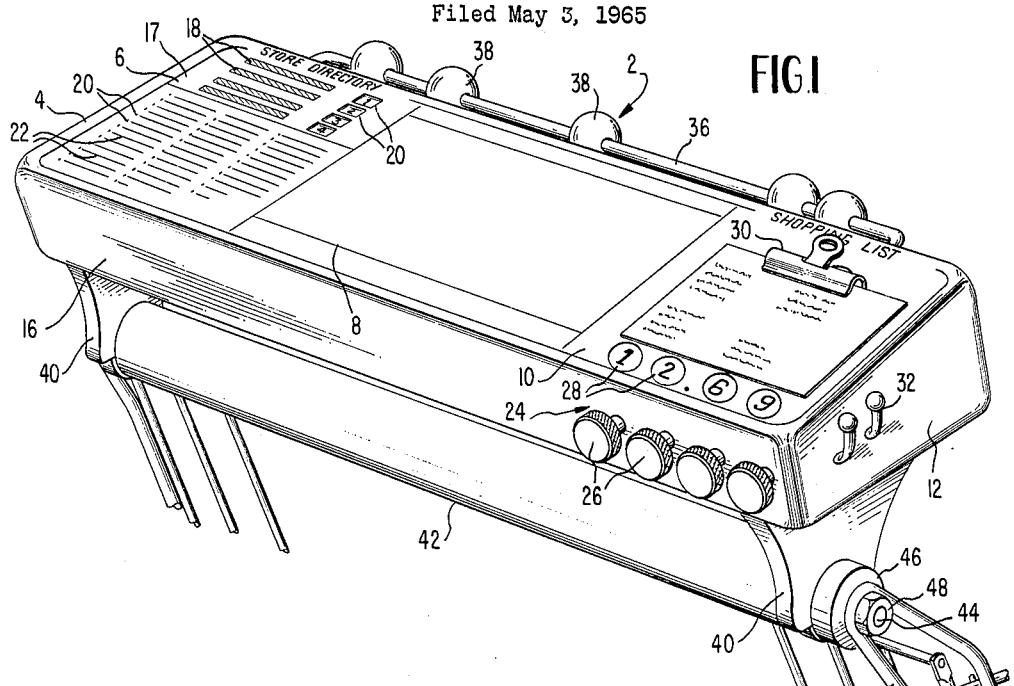
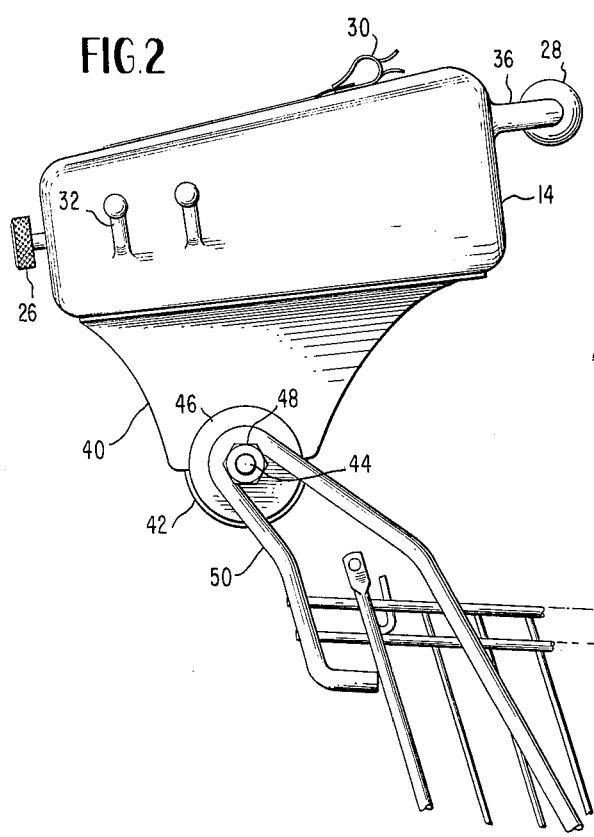
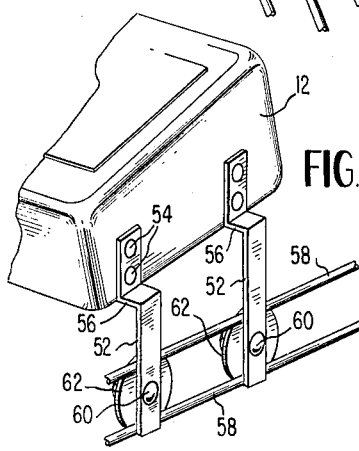
INVENTORS
FRED L. BUSH
PAUL ALLEN RYAN
ATTORNEYS

United States Patent Office 3,251,543
Patented May 17, 1966

---

3,251,543
SHOPPING CART ATTACHMENT
Fred L. Bush, 4080 Cleveland Ave., Columbus, Ohio, and Paul Allen Ryan, 5644 Linden Wood Road, Columbus 24, Ohio
Filed May 3, 1965, Ser. No. 452,556
8 Claims. (Cl. 235—1)

This invention relates to an attachment for a shopping cart, such as provided in self-service stores, and more particularly to an attachment displaying printed materials and including an adding machine.

In this era of large, so-called "supermarket" type stores purveying a wide variety of goods, including not only all forms of foodstuffs but also detergents, household supplies, some drugs, and a variety of other merchandise, the success of the marketing operation is dependent to a large extent upon the ease with which the customer may find, select, and "check-out" the desired merchandise. It is common knowledge that the variety of merchandise handled is so voluminous and varied that the mere location of the desired items by the prospective purchaser frequently becomes difficult and harassing if it is necessary to first locate a store attendant to direct the customer to the appropriate area of the store. Shopping carts are almost invariably provided, and these are propelled and guided by the customer to the appropriate area of the store where the selection of the desired goods is made.

With the supermarket system it has become commonplace for shoppers such as housewives to purchase a week's supply of foodstuffs and other household necessities at one shopping tour. This has led to the widespread preparation of "shopping lists" of greater or lesser length, which the shopper utilizes in collecting the desired items in the store. Generally speaking these items are more numerous than can simply be retained in one's memory.

In addition to the foregoing, all shoppers are cost conscious to a greater or lesser extent, and may well be induced to choose a particular store dependent upon the "sales" or reduced-cost items which may then be available there. However, the advantage of such sales may be completely lost if the customer cannot be advised thereof while in the supermarket and if the customer cannot readily locate the reduced-price items with ease.

In further addition to the foregoing, a large number of shoppers attempt to maintain the total price of the articles involved within a budgeted limit and are frequently perplexed with mental attempts to keep track of the total value of the merchandise selected and placed in the shopping cart.

Further complicating the task of the average shopper is the fact that it frequently is necessary to take small children along on the shopping tour, and generally speaking, some provision is made for carrying the child within the shopping cart or within an associated seat provided by the merchandising establishment. In order to minimize the frustration which may be involved as the child becomes bored, it is highly desirable to provide some form of readily available entertainment.

It is, accordingly, a primary object of the present invention to provide a compact and portable attachment for a grocery or shopping cart which will, at one and the same time, provide (1) a store directory to immediately enable the shopper to locate the respective departments and counters of the store, (2) advertising material to instantly acquaint the shopper with those goods on sale, their location and price, (3) a receptacle or mounting arrangement for the aforementioned shopping list so arranged so as to permit easy checking off of the articles listed thereon as the shopper places such objects in the cart, (4) means for maintaining a running total of the price of the merchandise placed in the cart, (5) toy means to entertain small children, and (6) means for supporting small objects such as shopping bags, purses, etc. with which the shopper may be burdened.

It is another object of the invention to provide a device of the foregoing type which is simple in construction, low in cost, and readily mountable and demountable from conventional shopping carts.

It is a still further object of the invention to provide an attachment for shopping carts containing a built-in adding machine enabling the purchaser to maintain a running total of the cost of the items selected and placed in the cart.

It is still another object of the invention to provide a device of the foregoing type which is unitary in nature so as to minimize or completely eliminate the possibility that portions thereof may be removed, lost, or stolen.

It is a still further object of the invention to provide an improved attachment for shopping carts having built-in advertising, directory, shopping list, and adding machine features which are so readily accessible and simple in operation as to be self-explanatory to the customer.

These and further objects and advantages of this invention will become apparent in reference to the following specification, claims and drawings, wherein:

FIGURE 1 is a perspective view of the attachment of this invention, further showing the manner in which it is fastened to a shopping cart;

FIGURE 2 is a side elevation view of the attachment of FIGURE 1; and

FIGURE 3 is a partial perpsective view of the attachment of this invention having a modified fastening means.

Referring to FIGURE 1, the shopping cart attachment 2 includes a display panel 4 affixed to the handle or push bar of the shopping cart. The display panel includes a store directory space 6, an advertising space 8, and a space 10 in which a shopping list is held. Space 10 also includes means for displaying the running total registered in an adding machine.

The attachment includes side walls 12, a back or rear wall 14, and a front wall 16. The attachment is formed of a suitable lightweight material, such as a plastic which is available in a variety of colors. The walls and the display panel form an enclosure in which an adding machine is secured, as by bolts, brackets, etc. The display panel is tilted or formed at an angle to the horizontal to be easily within view of the customer as the cart is pushed.

A store directory in the form of a sheet or card 17 is held in position in space 6 to afford the shopper information as to the various departments of the store and the variety of merchandise available in these departments. The sheet or card 17 includes printed strips 18 which contain the names or a description of the various store departments, such as meat, vegetables, etc., in the case of a grocery store. Each department is designated by a number 20 positioned adjacent the printed strips 18, so that the department may be readily correlated with its number.

Immediately below the strips 18, a number of additional printed strips 22 are arranged in columns, each containing the name of an item of merchandise. Immediately to the left of each strip 22 is one of the numbers 20 for identifying the department in which the item is located.

Of course, other arrangements of directory information, consistent with the arrangement of a particular store, may appear on the directory card. For example, numbers 20 may be used to indicate correspondingly numbered rows of shelves or aisles in the store. The directory eliminates the need for consulting a centrally located store directory, as is found in most retail stores and which is often inconvenient to find from different areas of the store. When the shopper has the directory constantly in view, it often happens that he will find himself near and purchase an item which he may not have otherwise bothered to locate.

The store directory may be affixed to space 6 in a number of ways, such as by clips at the top and bottom of the space for holding the card or sheet. Brackets may be provided at the edges of the space into which a printed card may be inserted, and covered with a transparent glass or plastic cover. As a still further embodiment, the sheet or card may be held in position by pressure sensitive tape. The strips and numbers 18, 20 and 22 may be printed on the card, and the entire card replaced if the information is to be changed. Alternatively, the card may be formed of a suitably heavy material such as cardboard permanently affixed in space 6, and contain slots into which printed strips may be inserted.

The display space 8 is utilized for the attachment of a sheet or card of advertising or promotional material. The space 8 is sufficiently large that a variety of advertising material may be displayed, including handbills and newspaper advertisements of varying sizes.

The side-by-side display of advertising or promotional material and the directory is, quite obviously, a great inducement to the shopper. Not only may his attention or interest be captured, but he has available the directory for locating the proper place in the store without the necessity of consulting a clerk or locating a central directory.

The space 8 is provided at its periphery with a suitable fastening means, such as the clips or brackets, etc. as was utilized for holding the store directory sheet in position. The advertising space may be provided with a transparent cover, so a specific item of merchandise may be displayed beneath it, secured from theft or damage.

An adding machine, generally indicated at 24 is contained within the attachment 2 under the rightwardly located display space 10 for providing a running total of the items selected for purchase. The adding machine includes a plurality of keys or buttons 26 positioned on the front wall 16 of the attachment to be easily accessible to the customer. The display space 10 contains a plurality of openings or windows 28 through which the running or cumulative total of the amount registered in the adding machine is displayed. The decimal point indication may be formed or marked on the display panel. The adding machine utilized may be of any conventional design capable of indicating a running total, and preferably capable of subtraction, such as that described in United States Patent No. 2,989,231, or such as that shown and described in United States Patent No. 3,010,646. With the subtracting feature, the price of an item which is returned to the shelf may be subtracted from the running total. The adding machine provides an indication as to whether or not special or advertised items may be purchased within the limits of the customer's budget and may be an inducement to purchase additional advertised items. Also, a knowledge of the total price of the purchased items eliminates the necessity of returning items to the display shelves from the check-out counters, as often happens when the amount of money carried by the customer has been exceeded by the price of the goods. Such returns delay the check-out time and often require additional clerks to return the items while the check-out clerk remains at the cash register.

Although the adding machine has been illustrated as containing keys or buttons 26 on the front 10, these keys may be located elsewhere, such as in vertical or horizontal alignment on the display panel. The number and the general arrangement of the keys may be varied, consistent with the construction of the adding machine selected for use with the invention. The display windows may be varied both in location and number, if desired. The adding machine is secured within the attachment 2 in a suitable manner, such as with mounting brackets, so it may be easily removed for repair or replacement.

Of course, the positions of the directory, the advertising space and the adding machine may be varied, but it has been found most convenient to position the adding machine at the right hand side of the attachment for use by the right handed majority of customers.

A spring clip 30 is fastened to the attachment near the top of space 10. This clip allows shopping lists or directions, as often carried by shoppers, to be easily retained in their view. The clip is positioned so that a sufficiently large list may be displayed without its bottom covering the windows 28. The simultaneous displaying of the shopping list with the store directory facilitates the location of the desired items, to the convenience of the customer.

Hooks 32 are attached to each side 12 of the cart upon which purses, shopping bags, etc., commonly carried by shoppers may be hung. These hooks eliminate the necessity of placing a purse in the shopping cart where it may be damaged by the purchased items and hard to reach by the customer.

Shopping carts are customarily provided with a folding seat 34 (FIGURE 2) in which children are carried, facing the customer. In order to amuse them while they are being transported and divert their attention from the items on the display shelves and in the cart, the rear 14 of the attachment is provided with a rod 36, having bent ends for fastening to the rear wall of the attachment. Beads 38, which may be made in various colors and configuration, are slidably retained on the rod for the amusement of children riding in the folding seat. The rod may be fastened to the rear wall in any suitable manner, such as by brackets or insertion into holes provided in the rear wall. Also, the beads may be used by the shopper to count the number of items purchased to check that all of the items on the shopping list have been purchased. A pencil may be attached by a string to rod 36, so that notations may be made on the shopping list. Also, clip 30 may be used to hold blank paper supplied by the store, so that the pencil can be used to formulate a shopping list from the advertising material.

As seen at FIGURES 1 and 2, the attachment is formed with a pair of downwardly depending integral flanges 40. The flanges are spaced suitably far apart to contain an enlarged shopping cart handle 42 between them. Handle 42 is provided with a bore through which is inserted a support rod 44, threaded at each end. The rod is sufficiently long to extend beyond the flanges and carry an enlarged washer 46 and a nut 48 at each end. The rod also extends through the loop of the handle supports 50 at each side of the cart. Alternatively only one end of the rod need be threaded and the other end formed with a bolt type head which may be turned by a screwdriver. The flanges are each provided with a groove at its end, not shown, for receiving rod 44.

To fasten attachment 2 to the cart, the flanges are pushed down to receive rod 44 in their grooves. The washers 46 are positioned on the rod outside of the flanges, and nuts 48 are threaded on the ends of the rod. The tightening of nuts 48 causes each handle support 50 and washer 46 to urge the associated flange into contact with the end of the handle 42. The frictional engagement of the flanges between the washers and the ends of the handle prevents the attachment from being inadvertently rotated, either from its own weight or from being pushed on by a child or shopper. The flanges support the attachment above the handle, so the handle may be readily grasped and the adding machine and beads may be conveniently used. Preferably, the flanges may be made so they must be flexed outwardly slightly to fit over the handle 42. Also, support 50 may be formed so they must be flexed slightly outwardly to fit against washers 46. Such flexing of the flanges and supports enhances the frictional engagement of the flanges.

At FIGURE 3, an alternative fastening means for attachment 2 is illustrated. Each side wall 12 of the attachment is provided with a pair of depending flanges 52, secured by rivets 54. The hooks 32 may be positioned between flanges 52. The flanges are bent at 56 so their ends will extend just outside of the wire stock 58 of which the shopping cart is formed. Each flange is provided with a hole near its end through which a bolt having a threaded end is inserted. An enlarged washer 62 is placed on each bolt immediately inside the cart. A nut, not illustrated, urges each washer 62 against the wire stock to secure the flange to the cart. The washers are, of course, somewhat larger than the spacing of the wire stock.

The attachment may be easily removed by unscrewing the nuts on rod 44 or bolts 60. However, the use of hand tools, such as a plier and screwdriver, would be required so that the attachment may not be readily removed by a shopper. Also, the adding machine cannot be stolen or tampered with as it is fastened within the attachment and not accessible to a customer or child.

From the foregoing it will be readily apparent that the present invention provides an attachment which may be readily attached to a shopping cart and which is free from theft. The attachment provides a great number of conveniences which are desirable for the shopper, and are ordinarily not available or are located throughout the store. Advertising material and a store directory are positioned on the attachment to be within the constant view of the customer, and are readily replaceable. A child riding in the seat of the cart is provided with an amusement device. Purses and shopping bags may be placed on hooks which are conveniently located, but out of the reach of children riding in the cart. A running total of the items selected for puchase may be kept in constant view, as may a shopping list. The machine by which the running total is registered is fastened to be easily removable for repair but free from theft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A shopping cart including side supports and a handle, the handle having therethrough a longitudinal bore, a support rod positioned within the bore and connected to the side supports, and an attachment comprising a display panel, a store directory positioned on said display panel for indicating the location of items for sale, a space on said display panel for displaying advertising, fastening means on said display panel for attaching papers thereto, an adding machine integral with said attachment for providing a running total of the items selected for purchase, a number of support flanges extending downwardly from the attachment having therein grooves for receiving the support rod, and means connected to the support rod for securing the flanges against the handle in fixed relation thereto.

2. An attachment for a shopping cart including side supports and a handle, the handle having therethrough a longitudinal bore, a support rod positioned within the bore and connected to the side supports of the cart, said attachment comprising a display panel, means for securing said attachment above said handle, a store directory positioned on said display panel, a space on said panel for displaying advertising material, means on said panel for removably securing papers, an adding machine supported beneath said display panel, registering means extending from said attachment for registering amounts in said adding machine, and visual display means on said display panel for indicating the running total of the amounts registered in said adding machine the securing means comprising a number of support flanges extending downwardly from the under surface of the attachment, having therein grooves for receiving the support rod, and means connected to the support rod for securing the flanges against the handle in fixed relation thereto.

3. An attachment for a shopping cart including side supports and a handle, the handle having therethrough a longitudinal bore, a support rod positioned within the bore and connected to the side supports of the shopping cart, and a folding seat for carrying an infant, said attachment comprising a display panel, a first space on said panel for holding a store directory, a second space on said panel for holding advertising material, said first and second spaces being located adjacent each other, a clip on said panel for securing papers, an adding machine positioned below said panel for registering the running total of items selected for purchase, visual means on said panel for displaying said running total, said visual means being located below said clip, a rod affixed to said attachment, a plurality of purchase-counting means slidably carried on said rod, said means being accessible from said folding seat as well as from outside the cart, and means for supporting said attachment above the handle of said cart comprising a number of support flanges extending downwardly from the under surface of the attachment, having therein grooves for receiving the support rod, and means connected to the support rod for securing the flanges against the handle in fixed relation thereto.

4. An attachment for a shopping cart including side supports and a handle, the handle having therethrough a longitudinal bore, a support rod positioned within the bore and connected to the side supports, the attachment comprising a front wall, a rear wall, a pair of side walls, a display panel supported by said walls, an enclosure formed by said walls and said display panel, an adding machine contained within said enclosure, registering means on said front wall for registering amounts in said adding machine, display means on said panel for visually displaying the running total of the registered amounts, a store directory positioned on said display panel, a space on said display panel for supporting advertising material, said space being located immediately adjacent said store directory, clip means positioned adjacent to the registering means on said display panel for retaining papers, hook means on one of said side walls, a rod secured to said rear wall, a plurality of purchase-counting means slidably carried on said rod, and downwardly depending fastening means for fastening said attachment to the handle of said cart.

5. The attachment of claim 4 in which the fastening means comprises a number of support flanges extending downwardly from the under surface of the enclosure, and having therein grooves for receiving the support rod, and means connected to the support rod for securing the flanges against the handle in fixed relationship thereto.

6. An attachment for a shopping cart having a folding seat, said attachment comprising a front wall, a rear wall, a pair of side walls, a display panel supported by said walls, said display panel being formed at an angle to the horizontal, a store directory removably positioned at one end of said display panel, advertising material removably positioned on said display panel immediately adjacent to the directory, holding means immediately adjacent to the advertising material for attaching papers to said display panel, said walls and said display panel forming an enclosure, an adding machine removably positioned within said enclosure, registering means on said front wall for registering various amounts in said adding machine, indicating means on said display panel below the holding means for visually indicating the running sum of said registered amounts, said visual means, advertising material, and store directory being simultaneously visible, a rod carrying purchase-counting means fastened to said rear wall, a hook fastened to said side wall, and support means for fastening said attachment above said cart.

7. The attachment of claim 6 in which said support means are flanges adapted for fastening to the handle of said cart.

8. The attachment of claim 6 in which said support means are flanges integral with the side walls of said attachment, and including apertures therethrough, and fastening means extending through the apertures and rigidly connecting the flanges to the side walls of the shopping cart.

References Cited by the Examiner

UNITED STATES PATENTS

| 1,819,755 | 8/1931 | Primos | 248—205 |
| 2,129,647 | 9/1938 | Carnes et al. | |
| 2,687,589 | 8/1954 | Brockway. | |
| 2,888,761 | 6/1959 | Miller | 40—308 |
| 2,895,243 | 7/1959 | Hummer et al. | |

FOREIGN PATENTS 862,986   3/1961   Great Britain.

LOUIS J. CAPOZI, *Primary Examiner.*

LEO SMILOW, *Examiner.*

C. G. COVELL, *Assistant Examiner.*